Patented June 20, 1939

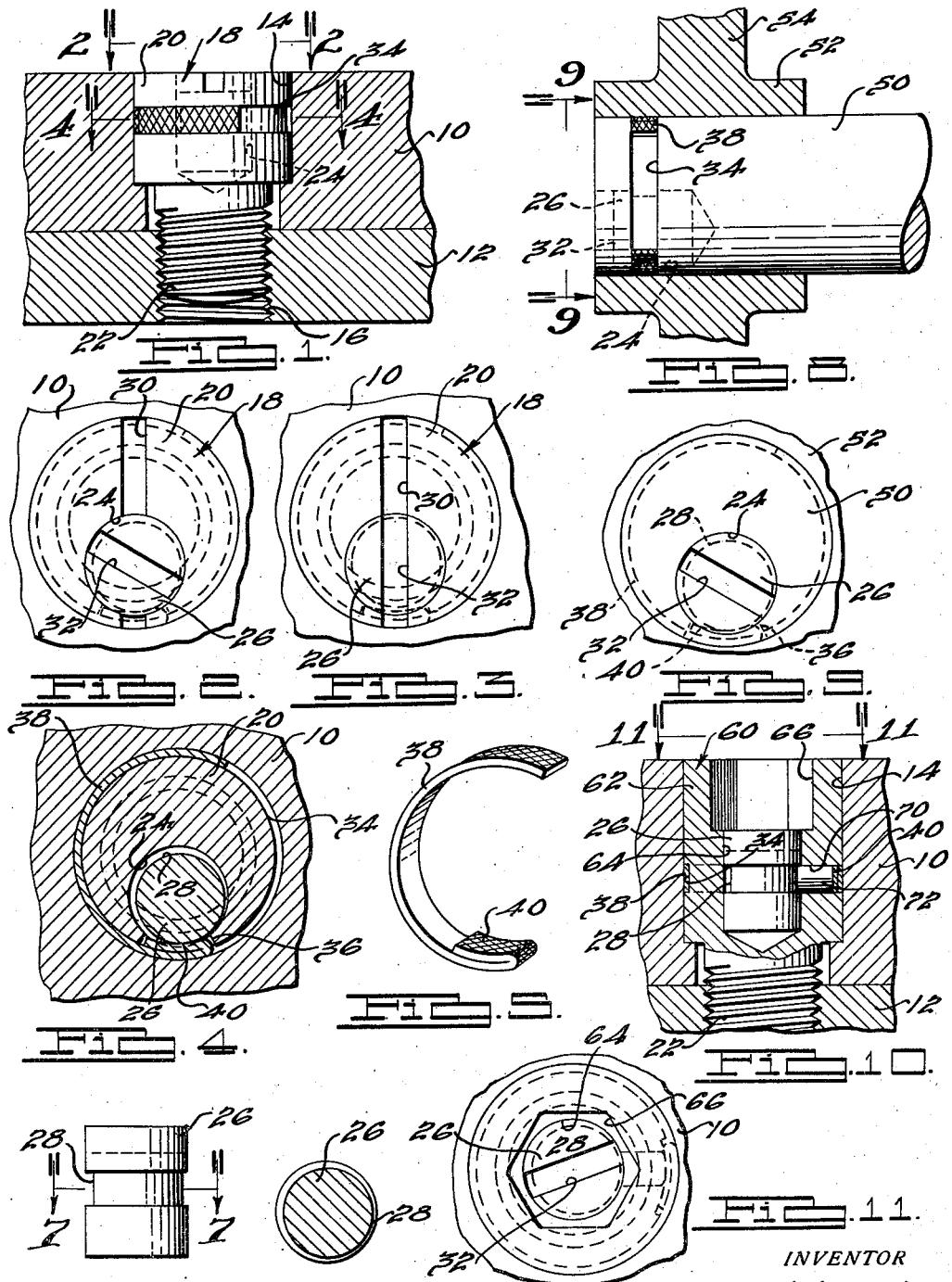

2,162,849

UNITED STATES PATENT OFFICE 2,162,849

LOCKING DEVICE

Howard E. Landis, Detroit, Mich.

Application January 14, 1938, Serial No. 184,933

10 Claims. (Cl. 151—32)

This invention relates to structures for releasably locking two members against relative movement.

One of the primary objects of the present invention is to provide a simplified locking means whereby two members which are initially relatively movable may be releasably locked together.

A further object of the present invention is to provide improved screw structures which may be readily, releasably locked in position.

A further object of the present invention is to provide an improved structure associated with a fillister head screw whereby the screw may be readily, releasably locked in place.

Other objects of the invention will become apparent to those skilled in the art from the following specification, the drawing relating thereto, and from the claims hereinafter set forth.

In the drawing in which like numerals are used to designate like parts in the several views throughout:

Figure 1 is a fragmentary cross-sectional view, with parts in elevation, of a fillister head screw embodying features of the present invention;

Fig. 2 is an enlarged, fragmentary top plan view taken substantially along the line 2—2 of Fig. 1 illustrating the parts in locked position;

Fig. 3 is a view similar to Fig. 2 illustrating the parts in unlocked position;

Fig. 4 is an enlarged cross-sectional view taken substantially along the line 4—4 of Fig. 1;

Fig. 5 is a perspective view of one of the locking elements;

Fig. 6 is an elevational view of another of the locking elements;

Fig. 7 is a cross-sectional view taken substantially along the line 7—7 of Fig. 6;

Fig. 8 is a fragmentary cross-sectional view, with parts in elevation, illustrating a modified form of the present invention;

Fig. 9 is an enlarged end elevational view taken substantially along the line 9—9 of Fig. 8;

Fig. 10 is a view similar to Fig. 1 illustrating another modified form of the present invention; and, Fig. 11 is an enlarged fragmentary top plan view taken substantially along the line 11—11 of Fig. 10.

The locking means of the present invention is adapted for a variety of uses. One of the principal uses of the structure of the present invention is in constructing fillister head screws; and another use of the present invention is in fixing a rod member, such as a shaft, to a hub member or the like. Other uses will become apparent to those skilled in the art from the following description.

Referring to the drawing, and referring particularly to Figs. 1 to 7, one embodiment of the invention is illustrated for securing two members 10 and 12 together. The member 10 is provided with a substantially cylindrical shouldered opening 14 therethrough; and the member 12 is provided with a threaded opening 16 therethrough for the reception of a head end and a threaded end, respectively, of a fillister head screw generally indicated at 18. The screw member 18 has a fillister head 20 and a threaded end 22; and in securing the members 10 and 12 together, the fillister head 20 is embraced by the shouldered opening 14 and the threaded end 22 is threadably received within the threaded opening 16.

For releasably locking the screw 18 relative to the member 10, a substantially cylindrical recess 24 is provided within the head 20, opening through the top thereof, and extending longitudinally of the head in offset relation to the longitudinal center line of the screw 18. A substantially cylindrical member 26 is adapted to be slidably received within the recess 24 so that it may be rotated therein relative to the head 20. The member 26 is provided with an annular recess 28 intermediate its ends which in section is in the form of a circle, and which is offset to one side of the longitudinal center line of the member 26 so as to provide a cam surface.

The fillister head 20 is provided with the usual slot 30 in the head thereof for the reception of a tool, such as a screw driver; and the cylindrical member 26 is also provided with a similar slot 32 for the reception of a screw driver.

The fillister head 20 is provided with an annular recess or groove 34 in the peripheral wall intermediate the ends of the head and so positioned that the recess 34 is at the same level as the recess 28. An aperture 36 is provided through the base of the recess 34 and communicates with the cylindrical opening 24 adjacent the cam surface 28, and also communicates with the cylindrical opening 14. A spring clip member 38 of spring steel in the form of a partial sleeve is positioned within the recess 34. The sleeve 38 need not extend completely around the groove 34, but it is preferable to have it of such length that it will extend around the groove a distance slightly greater than one-half the circumference of the groove, so that the clip will retain itself within the groove. One end of the clip is folded upon itself as indicated at 40 so as to provide a double thickness at this end. The portion 40 is slightly less in length than the length of the aperture 36; and the clip 38 is positioned so that the folded back portion 40 lies within the aperture 36 and may be engaged by the cam surface 28. The clip 38 is preferably knurled on its outer surface, including the outer surface of the folded back portion, and is of such thickness relative to the depth of the groove 34 that the outer surface of the clip is substantially flush with the outer peripheral surface of the head 20 or slightly spaced inwardly therefrom. The inherent resiliency in the clip 38 retains the surfaces in this relationship.

In use with the slots 30 and 32 aligned, as indicated in Fig. 3, the cam is in its open position and the screw 18 may be turned relative to the member 10. The screw is drawn up in this position until the members 10 and 12 are securely positioned together; and then by turning the cylindrical member 26 within the opening 24, by engaging the slot 32, the cam surface 28 engages the turned back portion 40 of the clip 38 and urges that end of the clip radially outwardly. The outer surface of the clip is thus forced into engagement with the inner wall of the opening 14 thus locking the screw 18 relative to the member 10. To release the screw it is merely necessary to turn the cylindrical member 26 so that the slot 32 is aligned with the slot 30; and then the screw 18 may be turned relative to the member 10, to either further tighten the connection or withdraw the screw.

Referring to Figs. 8 and 9 a modified embodiment of the present invention is illustrated in which the end of a cylindrical shaft 50 is releasably received within the hub portion 52 of a wheel 54, or the like. In this embodiment of the invention the hub portion 52 corresponds to the member 10 of the embodiment described above; and the cylindrical end portion of the shaft 50 within the hub corresponds to the fillister head 20 of the embodiment described above. A recess 24 is provided extending longitudinally over the shaft in offset relation to the longitudinal center line of the shaft. The locking element or cylindrical member 26 is received within this recess and is similar to the locking element in the embodiment described above. The shaft 50 is provided also with an annular recess 34 which receives therein the clip 38 in the relation of the embodiment described above. An aperture 36 is also provided in the wall of the shaft 50 through the base of the recess 34 communicating the recess 24 with the opening through the hub 52.

The operation of the structure illustrated in Figs. 8 and 9 is the same as that of the structure described above. By turning the cylindrical member 26, by engagement of a tool within the slot 32, relative to the shaft 50, the cam surface 28 engages the turned back portion 40 and urges the clip 38 radially outwardly into engagement with the inner wall of the opening through the hub 52. The shaft 50 is thus locked relative to the wheel 54, and may be released by returning the cylindrical member 26 to its initial position.

In Figs. 10 and 11, another embodiment of the present invention is illustrated in which a screw member generally indicated at 60 has a cylindrical head 62 adapted to be received within the shoulder cylindrical opening 14 in the member 10. The head 62 is provided with a longitudinally extending centrally disposed recess having the lower portion 64 thereof cylindrical in shape. The upper portion 66 is shaped to receive a turning tool and, in the embodiment illustrated, is hexagonal in shape.

The cylindrical member 26 is received within the cylindrical portion 64 and may be turned therein by engagement with the slot 32. The head 62 is also provided with a groove 34, corresponding to the groove of the embodiment described above, which receives therein a clip 38 in the relationship described above. An aperture is provided through the base of the groove so that the portion 40 lies within the aperture as in the embodiment described above. Instead of the clip 38, a split ring may be used which overlies the aperture and dispenses with the turned back portion 40. A substantially cylindrical opening 70 is provided through the wall of the head 62 and communicates with the cylindrical portion 64 adjacent the cam surface 28 of the cylindrical member 26. A sliding pin member 72 which is of a shape complementary to the shape of the opening 70 is positioned within the opening 70. The inner end of the pin 72 is adapted to be engaged by the cam surface 28 and the outer end is adapted to be engaged by the clip 40.

In operation, to tighten the screw 60, a tool having a shape complementary to the shape of the opening 66 is inserted in the opening 66 and used to rotate the screw 60. To lock the head 62 relative to the member 10, the cylindrical member 26 is turned, as in the embodiment described above, and the cam surface 28 engages the sliding pin member 72 urging it outwardly and also urging the clip 38 radially outwardly into tight engagement with the inner wall of the opening 14. The parts are thus held in releasably locked position.

From the above description, it will be evident that the present invention provides simplified structures for releasably locking two members together which are initially movable relative to each other. Formal changes may be made in the specific embodiments of the invention described without departing from the spirit and substance of the broad invention, the scope of which is commensurate with the appended claims.

What is claimed is:

1. In combination, a first member, a second member initially movable relative to the first member, said first member having a cylindrical portion which is embraced by a cylindrical opening in the second member, and means for releasably locking said first and second members together, said last named means including a cylindrical member movably received within a longitudinally extending cylindrical opening in said cylindrical portion, said cylindrical member having a portion of its wall shaped to provide a cam surface, said cylindrical portion having an aperture in the wall thereof communicating with said first named cylindrical opening and said last named cylindrical opening adjacent said cam surface, and movable means engaging said cam surface through said aperture and engaging said second member to releasably lock said first and second members against relative movement.

2. In combination, a first member, a second member initially movable relative to the first member, said first member having a substantially cylindrical portion which is embraced by a substantially cylindrical opening in the second member, and means for releasably locking said first and second members together, said last named means including a substantially cylindrical member movably received within a longitudinally extending, substantially cylindrical opening in said cylindrical portion, said last named opening being offset from the center of said cylindrical portion, said cylindrical member having a portion of its wall shaped to provide a cam surface, said cylindrical portion having an aperture in the wall thereof in communication with said first named cylindrical opening and said last named cylindrical opening adjacent said cam surface, and movable means engaging said cam surface through said aperture and engaging said second member to releasably lock said first and second members against relative movement.

3. In combination, a first member, a second member initially movable relative to the first member, said first member having a substantially cylindrical portion which is embraced by a substantially cylindrical opening in the second member, and means for releasably locking said first and second members together, said last named means including a substantially cylindrical member movably received within a longitudinally extending, substantially cylindrical opening in said cylindrical portion, said cylindrical member having an annular recess formed in its wall with the base of said recess shaped to provide a cam surface, said cylindrical portion having an aperture in the wall thereof communicating with said first named cylindrical opening and said last named cylindrical opening adjacent said cam surface, and movable means engaging said cam surface through said aperture and engaging said second member to releasably lock said first and second members against relative movement.

4. In combination, a first member, and a second member initially movable relative to the first member, said first member having a substantially cylindrical portion which is embraced by a substantially cylindrical opening in the second member, and means for releasably locking said first and second members together, said last named means including a substantially cylindrical member movably received within a longitudinally extending, substantially cylindrical opening in said cylindrical portion, said cylindrcal member having an annular recess formed in the outer wall thereof with the base of said recess shaped to provide a cam surface, said cylindrical portion also having an annular recess formed in its outer wall with an aperture in the base of said recess communicating with said first named cylindrical opening and said last named cylindrical opening adjacent said cam surface, and resilient means positioned within said last named annular recess having a portion extending through said aperture engaging said cam surface and engaging said member to releasably lock said first and second members against relative movement upon movement of said cylindrical member relative to said cylindrical portion.

5. Means for releasably locking two members together which are initially relatively movable and in which one of said members has a substantially cylindrical portion which is embraced within a substantially cylindrical portion of the other member including a substantially cylindrical member movably received within a longitudinally extending, substantially cylindrical opening in said cylindrical portion, said cylindrcal member having an annular recess in the wall thereof with the base of said recess extending longitudinally of said member and shaped to provide a cam surface, said cylindrical portion having an annular recess in the wall thereof with an aperture through the base of said recess communicating with said first named cylindrical opening and said last named cylindrical opening adjacent said cam surface, and means lying within said last named annular recess having a portion extending through said aperture into engagement with said cam surface and having a portion engaging said second member to releasably lock said first and second members against relative movement upon movement of said cylindrical member relative to said cylindrical portion.

6. In a device of the class described, a screw member having a fillister head, means forming a substantially cylindrical recess within said head longitudinally thereof, a substantially cylindrical member movably received within said cylindrical recess, said cylindrical member having a portion of its wall shaped to form a cam surface, said head having an aperture through the wall thereof communicating with said cylindrical recess adjacent said cam surface, and means having a portion extending through said aperture engaging said cam surface and having a portion normally substantially flush with the outer periphery of said head adapted to extend outwardly therebeyond upon relative movement between said cylindrical member and said head.

7. In a device of the class described, a screw member having a fillister head, means forming a substantially cylindrical recess within said head longitudinally thereof, a substantially cylindrical member movably received within said cylindrical recess, said cylindrical member having a portion of its wall shaped to form a cam surface, said head having a groove formed in the outer peripheral wall thereof, means forming an aperture through the base of said groove communicating with said cylindrical recess adjacent said cam surface, and movable means within said groove having a portion extending through said aperture engaging said cam surface and having a portion normally substantially flush with the outer periphery of said head adapted to extend outwardly therebeyond upon relative movement between said cylindrical member and said head.

8. In a device of the class described, a screw member having a fillister head, means forming a substantially cylindrical recess within said head longitudinally thereof and offset to one side of the longitudinal axis, a substantially cylindrical member movably received within said cylindrical recess, said cylindrical member having a portion of its wall shaped to form a cam surface, said head having a groove formed in the outer peripheral wall thereof, means forming an aperture through the base of said groove communicating with said cylindrical recess adjacent said cam surfaces, and movable means within said groove having a portion extending through said aperture engaging said cam surface and having a portion normally substantially flush with the outer periphery of said head adapted to extend outwardly therebeyond upon relative movement between said cylindrical member and said head.

9. In a device of the class described, a screw member having a fillister head, means forming a substantially cylindrical recess within said head longitudinally thereof and offset to one side of the longitudinal center thereof, a substantially cylindrical member movably received in said cylindrical recess, said cylindrical member having an annular recess formed therein with the base of said recess shaped to provide a cam surface, said head having an annular groove formed in the outer peripheral wall thereof, means forming an aperture through the base of said groove communicating with said cylindrical recess adjacent said cam surface, and elongated resilient means mounted within said groove having a portion extending through said aperture engaging said cam surface and having a portion normally substantially flush with the outer periphery of said head adapted to extend outwardly therebeyond upon relative movement between said cylindrical member and said head.

10. In a device of the class described, a screw member having a substantially cylindrical head, means forming a central recess within said head, the lower portion of said recess being cylindrical in form and the upper portion being shaped to cooperate with a turning tool, a substantially cylindrical member movably received within the cylindrical portion of said recess, said cylindrical member having a portion of its wall shaped to form a cam surface, said head having a groove formed in the outer peripheral wall thereof, means forming an aperture through the base of said groove communicating with said cylindrical portion of said cylindrical recess adjacent said cam surface, a pin member slidably received in said aperture, and resilient means mounted within said groove having a portion extending over said aperture, said resilient means being normally substantially flush with the outer periphery of said head and being adapted to extend outwardly therebeyond upon relative movement between said cylindrical member and said head.

HOWARD E. LANDIS.